United States Patent
Liu

(10) Patent No.: US 11,838,615 B2
(45) Date of Patent: Dec. 5, 2023

(54) TERMINAL DEVICE AND DUAL FRONT-FACING CAMERA OPERATING METHOD

(71) Applicant: GUANGDONG OPPO MOBILE TELECOMMUNICATIONS CORP., LTD., Guangdong (CN)

(72) Inventor: Chang Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/090,370

(22) Filed: Nov. 5, 2020

(65) Prior Publication Data
US 2021/0051253 A1    Feb. 18, 2021

Related U.S. Application Data

(63) Continuation of application No. PCT/CN2018/086047, filed on May 8, 2018.

(51) Int. Cl.
| | |
|---|---|
| *H04N 23/55* | (2023.01) |
| *H04N 23/54* | (2023.01) |
| *H04M 1/02* | (2006.01) |
| *H04N 5/262* | (2006.01) |

(52) U.S. Cl.
CPC .......... *H04N 23/55* (2023.01); *H04M 1/0264* (2013.01); *H04M 1/0266* (2013.01); *H04N 5/2624* (2013.01); *H04N 23/54* (2023.01)

(58) Field of Classification Search
CPC ..... G09G 2360/14; H10K 39/32; H10K 59/65
USPC .......................................................... 348/375
See application file for complete search history.

(56) References Cited

U.S. PATENT DOCUMENTS

| | | | |
|---|---|---|---|
| 9,013,613 B2 | 4/2015 | Ogita et al. | |
| 9,736,383 B2* | 8/2017 | Evans | H04M 1/72409 |
| 9,823,694 B2 | 11/2017 | Evans et al. | |
| 9,864,400 B2 | 1/2018 | Evans et al. | |
| 9,870,024 B2* | 1/2018 | Evans | H04N 23/57 |

(Continued)

FOREIGN PATENT DOCUMENTS

| | | |
|---|---|---|
| CN | 102348091 A | 2/2012 |
| CN | 105094307 A | 11/2015 |

(Continued)

OTHER PUBLICATIONS

International Search Report for PCT/CN/2018086047 dated Feb. 11, 2019.

(Continued)

*Primary Examiner* — Anthony J Daniels
(74) *Attorney, Agent, or Firm* — Young Basile Hanlon & MacFarlane, P.C.

(57) ABSTRACT

A terminal device includes a display unit, and an outer case, a first light sensing unit, and a second light sensing unit. The display unit has a display screen. The display unit displays images on the display screen. The outer case receives the display unit. The first light sensing unit is located below the display unit and configured to sense incident light transmitted through the display screen. The second light sensing unit is placed inside the outer case when deactivated, and extends outside the outer case when activated. Also, a dual front-facing camera operating method is provided.

20 Claims, 11 Drawing Sheets

(56) References Cited

U.S. PATENT DOCUMENTS

| | | | |
|---|---|---|---|
| 9,961,744 B1* | 5/2018 | Doar | H05B 47/11 |
| 2009/0141332 A1* | 6/2009 | Futatsuya | G01J 1/4204 |
| | | | 359/276 |
| 2012/0069042 A1 | 3/2012 | Ogita et al. | |
| 2013/0083214 A1* | 4/2013 | Nakata | H01L 27/14632 |
| | | | 257/E31.127 |
| 2013/0241891 A1* | 9/2013 | Usukura | G09G 3/3648 |
| | | | 345/175 |
| 2015/0035770 A1 | 2/2015 | Lee et al. | |
| 2016/0337588 A1* | 11/2016 | Wei | H04N 5/2258 |
| 2017/0124932 A1* | 5/2017 | Evans | G06F 1/1626 |
| 2017/0205923 A1 | 7/2017 | Shim et al. | |
| 2017/0237884 A1 | 8/2017 | Evans et al. | |
| 2019/0082519 A1* | 3/2019 | Gagne-Keats | G01J 3/36 |
| 2020/0213491 A1* | 7/2020 | Huang | H04M 1/0264 |

FOREIGN PATENT DOCUMENTS

| | | |
|---|---|---|
| CN | 107071244 A | 8/2017 |
| CN | 107580092 A | 1/2018 |
| CN | 107580774 A | 1/2018 |
| CN | 107734102 A | 2/2018 |
| CN | 107796512 A | 3/2018 |
| CN | 207075030 U | 3/2018 |
| CN | 107995331 A | 5/2018 |
| WO | 2018012719 A1 | 1/2018 |

OTHER PUBLICATIONS

Extended European Search Report for EP Application 18917652.2 dated Apr. 23, 2021. (24 pages).

Chinese Office Action with English Translation for CN Application 201880093266.1 dated Sep. 27, 2021. (23 pages).

* cited by examiner

TERMINAL DEVICE AND DUAL FRONT-FACING CAMERA OPERATING METHOD

CROSS-REFERENCE TO RELATED APPLICATION(S)

This application is a continuation of International Application No. PCT/CN2018/086047, filed on May 8, 2018, the entire content of which is incorporated herein by reference.

TECHNICAL FIELD

The present disclosure relates to terminal device technologies, and more particularly, to a terminal device and a dual front-facing camera operating method.

BACKGROUND

Front-facing camera-equipped terminal devices, such as smartphones and tablets, are being widely used. Front-facing cameras are placed on a same side of display screens of terminal devices. That is, the front sides of the terminal devices. The front-facing camera occupies a top or bottom part of the front side accompanied with other components, such as a speaker, a light sensor, and a light emitting diode (LED) indicator. The display screen does not occupy the full front side of the terminal devices. Accordingly, the size of the display screen cannot be efficiently maximized.

SUMMARY

In a first aspect of the present disclosure, a terminal device includes a display unit having a display screen, the display unit configured to display images on the display screen; an outer case configured to receive the display unit; a first light sensing unit located below the display unit and configured to sense incident light transmitted through the display screen; and a second light sensing unit moveably held to a first position inside the outer case responsive to deactivation of the second light sensing unit and moveably held to a second position outside the outer case responsive to activation of the second light sensing unit.

In a second aspect of the present disclosure, a terminal device includes a display unit having a display screen, the display unit configured to display images on the display screen; an outer case configured to receive the display unit; a first front-facing camera configured for face unlocking, the front-facing camera located below the display unit and configured to sense incident light transmitted through the display screen; and a second front-facing camera configured for selfies and/or video chatting, the second front-facing camera moveably held to a first position inside the outer case responsive to deactivation of the second front-facing camera and held configured to a second position outside the outer case responsive to activation of the second front-facing camera.

In a third aspect of the present disclosure, a dual front-facing camera operating method is provided. The method is applied to a terminal device including a display unit configured to display images on a display screen of the display unit. The method includes determining whether the display screen is locked; activating a first front-facing camera located below the display unit to capture an image of a face of a user if the display screen is locked; authenticating the user by using the captured face image of the user; unlocking the display screen and deactivating the first front-facing camera if the user is authenticated; determining whether a selfie mode is triggered; activating a second front-facing camera by extending the second front-facing camera outside a body of the terminal device to take selfie images and/or for video chatting in front of the terminal device if the selfie mode is triggered; and deactivating the second front-facing camera by retracting the second front-facing camera inside the body of the terminal device after completing image capturing and/or video recording.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1A:
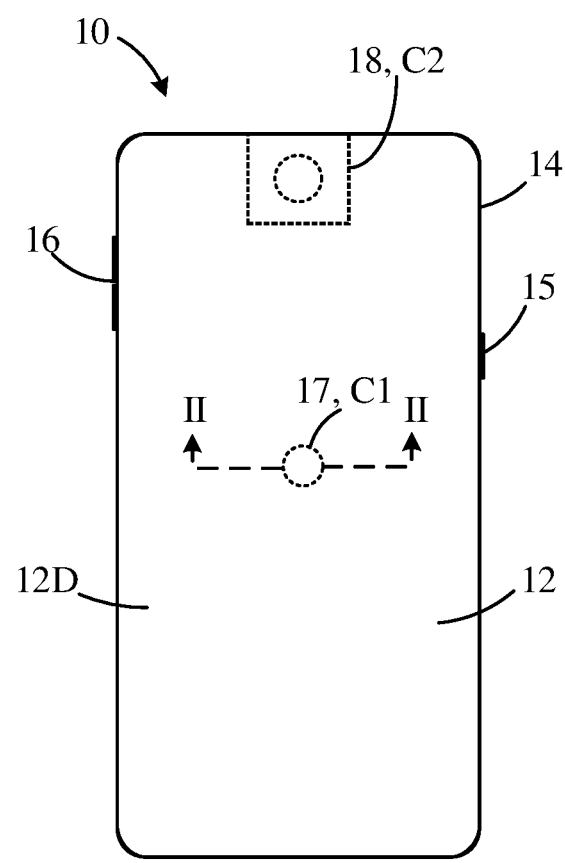
FIG. 1A is a front view of a terminal device with an inactive camera according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In an embodiment of the present disclosure, a terminal device includes a display unit having a display screen, the display unit configured to display images on the display screen; an outer case configured to receive the display unit; a first light sensing unit located below the display unit and configured to sense incident light transmitted through the display screen; and a second light sensing unit moveably held to a first position inside the outer case responsive to deactivation of the second light sensing unit and moveably held to a second position outside the outer case responsive to activation of the second light sensing unit.

In an embodiment of the present disclosure, the first light sensing unit is located between the display unit and the outer case or located at a center of the display screen.

In an embodiment of the present disclosure, the second light sensing unit extends from an edge of the outer case when the second light sensing unit is activated.

In an embodiment of the present disclosure, the outer case including a slot disposed corresponding to the second light sensing unit, and the second light sensing unit extends outside the outer case via the slot.

In an embodiment of the present disclosure, the second light sensing unit is rotatably held to a front position as a front-facing camera and is rotatably held to a rear position as a rear-facing camera.

In an embodiment of the present disclosure, the second light sensing unit includes a first shutter; a second shutter disposed opposite to the first shutter; a light guide located between the first shutter and the second shutter; an image sensor configured to capture images; and a lens group comprising one or more than one lens, the lens group located between the light guide and the image sensor, wherein the first shutter and the second shutter are inversely operated.

In an embodiment of the present disclosure, the first light sensing unit and the second light sensing unit offset from each other a distance whereby they do not overlap with each other with respect to a plane on the display screen.

In an embodiment of the present disclosure, the first light sensing unit and the second light sensing unit are carried by a first front-facing camera and a second front-facing cameras, respectively.

In an embodiment of the present disclosure, the first front-facing camera is configured for face unlocking and the second front-facing camera is configured for selfies and/or video chatting.

In an embodiment of the present disclosure, the display unit including a display panel which includes a first electrode which is a transparent electrode; a second electrode which is an opaque electrode; and an organic layer sandwiched between the first electrode and the second electrode, wherein the organic layer spontaneously emits light when a voltage difference is applied between the first electrode and the second electrode.

In an embodiment of the present disclosure, the display unit further includes a touch control electrode layer configured to detect touch operations and generate sensing signals correspondingly for determining coordinate(s) of one or more than one touched points or a gesture formed by the touched points.

In an embodiment of the present disclosure, the second electrode has a semi-transparent area disposed corresponding to the first light sensing unit and a remaining area which is an area of the second electrode except for the semi-transparent area.

In an embodiment of the present disclosure, the semi-transparent area and the remaining area are distributed with metal particles, and concentration of the metal particles in the semi-transparent area is less than the concentration of the metal particles in the remaining area.

In an embodiment of the present disclosure, a material of the metal particles distributed in the semi-transparent area is identical to or different from the material of the metal particles distributed in the remaining area.

In an embodiment of the present disclosure, the remaining area is configured to totally reflect the incident light transmitted through the display screen, and the semi-transparent area is configured to partially reflect and partially transmit the light transmitted through the display screen.

In an embodiment of the present disclosure, the semi-transparent area corresponds to a metal film, and transmittance and reflectance of the metal film are defined by a thickness of the metal film.

In an embodiment of the present disclosure, an average voltage difference applied between the semi-transparent area and the first electrode is greater than the average voltage difference applied between the remaining area and the first electrode.

In an embodiment of the present disclosure, the first light sensing unit includes a luminance color filter which includes mono-color filter units.

In an embodiment of the present disclosure, the terminal device further includes a timing control module configured to control a timing sequence in operating the first light sensing unit and the display unit.

In an embodiment of the present disclosure, the timing control module is configured to control the first light sensing unit to sense light intensity or capture one or more than one images while the display screen is turned off, and control the display unit to resume displaying the images after the first light sensing unit completes in light sensing or image capturing.

In an embodiment of the present disclosure, the first light sensing unit includes a shutter, and the timing control module is configured to control the shutter to be opened for a predetermined period of time based on a vertical blanking interval (VBI) of a frame of the images displayed by the display unit.

In an embodiment of the present disclosure, an open duration of the shutter overlaps with the VBI of the frame of the images displayed by the display unit.

In an embodiment of the present disclosure, the timing control module is configured to control the shutter to be opened for more than one time at a predetermined time interval based on the VBIs of the frame of the images displayed by the display unit.

In an embodiment of the present disclosure, the timing control module is configured to control the first light sensing unit to sense light intensity or capture one or more than one images while the display screen is turned on.

In an embodiment of the present disclosure, at least one of the first light sensing unit and the second light sensing unit comprises a camera and at least one of a luminance sensor and a proximity sensor.

In an embodiment of the present disclosure, a terminal device includes a display unit having a display screen, the display unit configured to display images on the display screen; and an outer case configured to receive the display unit, the display unit including a display panel which includes a first electrode which is a transparent electrode; a second electrode; and an organic layer sandwiched between the first electrode and the second electrode, the terminal device further including a first light sensing unit located below the display unit and configured to sense incident light transmitted through the display screen, the second electrode of the display panel of the display unit having a semi-transparent area disposed corresponding to the first light sensing unit and a remaining area which is an area of the second electrode except for the semi-transparent area, the semi-transparent area and the remaining area distributed with metal particles, and concentration of the metal particles in the semi-transparent area less than the concentration of the metal particles in the remaining area; and a second light sensing unit moveably held to a first position inside the outer case responsive to deactivation of the second light sensing unit and moveably held to a second position outside the outer case responsive to activation of the second light sensing unit.

In an embodiment of the present disclosure, a terminal device includes a display unit having a display screen, the display unit configured to display images on the display screen; an outer case configured to receive the display unit; a first front-facing camera configured for face unlocking, the front-facing camera located below the display unit and configured to sense incident light transmitted through the display screen; and a second front-facing camera configured for selfies and/or video chatting, the second front-facing camera moveably held to a first position inside the outer case responsive to deactivation of the second front-facing camera and held configured to a second position outside the outer case responsive to activation of the second front-facing camera.

In an embodiment of the present disclosure, a dual front-facing camera operating method is provided. The method is applied to a terminal device including a display unit configured to display images on a display screen of the display unit. The method includes determining whether the display screen is locked; activating a first front-facing camera located below the display unit to capture an image of a face of a user if the display screen is locked; authenticating the user by using the captured face image of the user; unlocking the display screen and deactivating the first front-facing camera if the user is authenticated; determining whether a selfie mode is triggered; activating a second front-facing camera by extending the second front-facing camera outside a body of the terminal device to take selfie images and/or for video chatting in front of the terminal device if the selfie mode is triggered; and deactivating the second front-facing camera by retracting the second front-facing camera inside the body of the terminal device after completing image capturing and/or video.

Figure 1B:
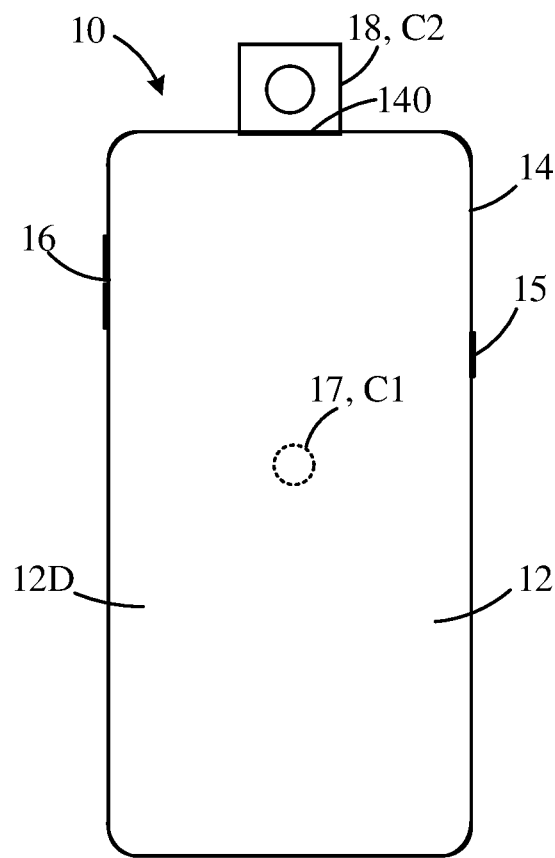
FIG. 1B is a front view of a terminal device with an active camera according to an embodiment of the present disclosure.

FIGS. 1A and 1B are front views of a terminal device 10 with an inactive and an active camera, respectively, according to an embodiment of the present disclosure. The terminal device 10 may be carried by a mobile phone terminal as illustrated in FIGS. 1A and 1B. The terminal device 10 includes a display unit 12 for displaying images, and an outer case 14 receiving the display unit 12. The terminal device 10 may also include functional buttons such as a power button 15 and a volume down/up button 16 protruded from the outer case 14 and located at lateral sides (e.g., left and right sides) of the terminal device 10. The display unit 12 has a display screen 12D exposed as an external surface of the terminal device 10 at a front side opposite to a rear side of the terminal device 10.

The terminal device 10 further includes a first light sensing unit 17 and a second light sensing unit 18. The first light sensing unit 17 may be carried by a first front-facing camera C1 and the second light sensing unit 18 may be carried by a second front-facing camera C2. That is, the terminal device 10 has dual front-facing cameras consisting of the first light sensing unit 17 and the second light sensing unit 18. The dual front-facing cameras are used to capture images of human bodies, objects, and/or scenes in front of the terminal device 10. In an illustrated example, the first front-facing camera C1 has a lower pixel count than the second front-facing camera C2. The first front-facing camera C1 is used for face unlocking. The second front-facing camera C2 is used for selfies and/or video chatting.

The first light sensing unit 17 is located below the display unit 12 and provided at a rear side of the display unit 12, particularly located between the display unit 12 and the outer case 14. The first light sensing unit 17 is configured to sense incident light rays transmitted through the display screen 12D of the display unit 12. The first light sensing unit 17 can be located at any position of the display screen 12D, for example, located at a top left corner, a top right corner, a bottom left corner, or a bottom right corner of the display screen 12D or arranged along with any of four edges of the display screen 12D. In an embodiment, the first light sensing unit 17 is located at a center of the display screen 12D, as illustrated in FIGS. 1A and 1B.

Regardless of what state the first light sensing unit 17 is (i.e., activated or deactivated), the first light sensing unit 17 is almost invisible to a user in front of the terminal device 10. Further, the deployment of the first light sensing unit 17 will almost certainly not affect the displaying of images on the display screen 12D. The display unit 12 can still provide an excellent viewing experience to users.

As illustrated in FIG. 1A, when inactive, the second light sensing unit 18 is disposed inside a body or the outer case 14 of the terminal device 10 and particularly, between the display unit 12 and a rear portion of the outer case 14, and is invisible to users in the front the terminal device 10. The first light sensing unit 17 and the second light sensing unit 18 offset from each other a distance whereby they do not overlap with each other with respect to a plane on the display screen 12D. As illustrated in FIG. 1B, when the second light sensing unit 18 is activated, the second light sensing unit 18 pops outside the body or the outer case 14 of the terminal device 10 and is no longer obscured by the display unit 12, so as to receive the light rays unobstructed by the terminal device 10 to be able to capture images of human bodies, objects, and/or scenes in front of the terminal device 10. That is, the second light sensing unit 18 is moveably held to a first position inside the outer case 14 responsive to deactivation of the second light sensing unit 18 and is moveably held to a second position outside the outer case 14 responsive to activation of the second light sensing unit 18. When the second light sensing unit 18 is deactivated, the second light sensing unit 18 retracts inside the body or the outer case 14 of the terminal device 10 and aligns with an edge of the outer case 14, and is unnoticeable to the users. That is, the second light sensing unit 18 is placed inside the terminal device 10 in an inactive state (see FIG. 1A) and the second light sensing unit 18 extends outside the terminal device 10 in an active state (see FIG. 1B). The second light sensing unit 18 pops out from an edge of the outer case 14 of the terminal device 10 whenever needed.

The second light sensing unit 18 can pop out from any lateral side of the terminal device 10 or any of four edges of the outer case 14. In an embodiment, the second light sensing unit 18 is disposed corresponding to a top side of the terminal device 10 or a top edge of the outer case 14 and can extend therefrom, as illustrated in FIGS. 1A and 1B. The outer case 14 may have a slot 140 disposed corresponding to the second light sensing unit 18. The second light sensing unit 18 extends outside and retracts inside the body of the terminal device 10 via the slot 140 of the outer case 14.

The second light sensing unit 18 may move linearly with use of a rack and pinion, a linear guide, and/or a spring when extending from or retracting back to the body of the terminal device 10. The shape of the second light sensing unit 18 can be square, rectangle, trapezoid, etc.

In an embodiment, the second light sensing unit 18 is rotatable after the second light sensing unit 18 extends outside the body or the outer case 14 of the terminal device 10. The second light sensing unit 18 can rotate to a fixed front position and serve as a front-facing camera to capture a scene in front of the terminal device 10. Also, the second light sensing unit 18 can rotate to a fixed rear position and serve as a rear-facing camera to capture a scene in rear of the terminal device 10. That is, the second light sensing unit 18 is rotatably held to a front position as a front-facing camera and is rotatably held to a rear position as a rear-facing camera. The second light sensing unit 18 can serve as a front-facing camera and a rear-facing camera. Accordingly, there is no need to deploy the front-facing camera and the rear-facing camera separately. The cost is reduced.

Figure 2:
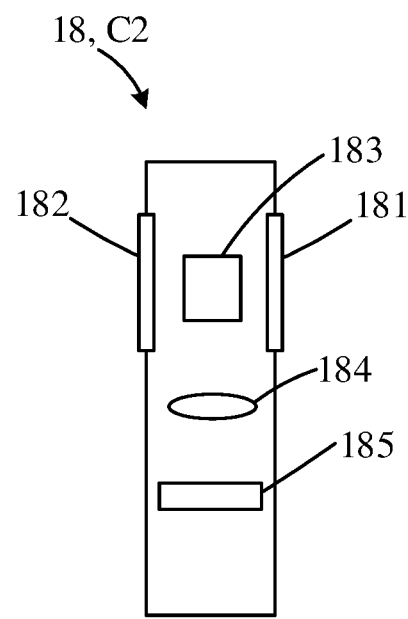
FIG. 2 is a lateral view of a second light sensing unit according to an embodiment of the present disclosure.

FIG. 2 is a lateral view of a second light sensing unit according to an embodiment of the present disclosure. In an embodiment, the second light sensing unit 18 includes a first shutter 181, a second shutter 182, a light guide 183, a lens group 184, and an image sensor 185. The first shutter 181 and the second shutter 182 are disposed opposite to each other. For example, the first shutter 181 is disposed corresponding to a front side of the terminal device 10, and the second shutter 182 is disposed corresponding to a rear side of the terminal device 10. The light guide 183 is disposed between the first shutter 181 and the second shutter 182. The lens group 184 includes one or more than one lenses. The image sensor 185 is configured to capture images. The lens group 184 is disposed between the light guide 183 and the image sensor 185. When the second light sensing unit 18 is activated, only one of the first shutter 181 and the second shutter 182 is opened. That is, the second light sensing unit 18 may serve as a front-facing camera when the first shutter 181 is opened, and the second light sensing unit 18 may serve as a rear-facing camera when the second shutter 182 is opened. As the front-facing camera, a scene in front of the terminal device 10 is imaged on the image sensor 185 via the light guide 183 and the lens group 185. Similarly, as the rear-facing camera, a scene in rear of the terminal device 10 is imaged on the image sensor 185 via the light guide 183 and the lens group 185. Accordingly, the front-facing and the rear-facing cameras are achieved by the second light sensing unit in an efficient way.

The first light sensing unit 17 is located below the display unit 12 and the second light sensing unit 18 hides under the display unit 12. That is, the first and the second light sensing units 17 and 18 are integrated into the terminal device 10 without a need to occupy an area on the front surface of the terminal device 10. Accordingly, display screen area can increase and display screen-to-body ratio is maximized. A true full display is realized and thus immersive viewing experience is provided to users.

In a case that the first light sensing unit 17 is the first front-facing camera C1 for face unlocking and the second light sensing unit 18 is the second front-facing camera C2 for selfies and/or video chatting, the second front-facing camera C2 can keep same user experience as a traditional front-facing camera when used in picture and video capturing, video catting, and the like, and the face unlocking function using the first front-facing camera C1 is instant without a need to wait for camera pop-out for authentication. This approach can maximize the display screen-to-body ratio without sacrificing any user experience for instant face unlocking and image capturing.

The terminal device 10 can be realized by a mobile terminal such as a mobile phone, smartphone, personal digital assistants (PDA), tablet, and video gaming device, a portable terminal such as a laptop and notebook, or a relatively large-sized device such as a computer display and television, or any other type of device having light sensing units hided below or inside a display body.

Figure 3A:
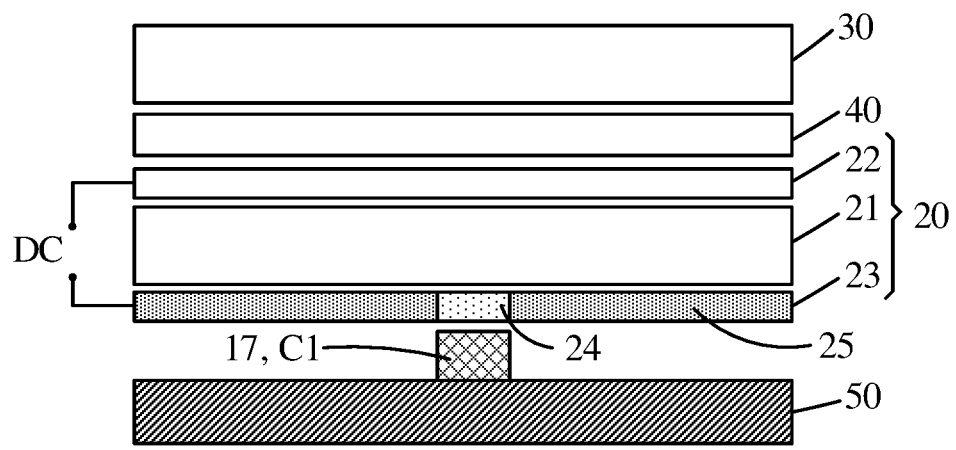
FIG. 3A is a sectional view of the terminal device taken along II-II of FIG. 1A in an example.

FIG. 3A is a sectional view of the terminal device 10 taken along II-II of FIG. 1A. The display unit 12 includes a display panel 20. In an embodiment, the display panel 20 is an organic light emitting diode (OLED) display panel. The display panel 20 includes an organic layer 21, a first electrode 22, and a second electrode 23. The organic layer 21 is sandwiched between the first electrode 22 and the second electrode 23. The organic layer 21 is divided into a red layer corresponding to red pixels, a green layer corresponding to green pixels, and a blue layer corresponding to blue pixels. When a voltage difference is applied between the first electrode 22 and the second electrode 23, the organic layer 21 spontaneously emits light. Particularly, the red layer emits red light, the green layer emits green light, and the blue layer emits blue light for color display. Self-illumination is achieved by the display panel 20.

The first electrode 22 is a transparent electrode made of, for example, indium thin oxide (ITO). The second electrode 23 is a metal layer formed on the organic layer 21 by deposition or coating. The second electrode 23 is an opaque electrode. The light emitted from the organic layer 21 may directly go through the first electrode 22 and emit from an external side of the first electrode 22 or may be reflected by the second electrode 23 toward a direction from the second electrode 23 to the first electrode 22. The display panel 20 belongs to a single-sided light emission type.

The display unit 12 includes a cover plate 30 made of plastic or glass. The cover plate 30 is the outermost layer of the display unit 12. The light emitted from the organic layer 21 of the display panel 20 exits the display unit 12 from an external side of the cover plate 30 to an environment of the terminal device 10 and is viewed by a user in front of the terminal device 10.

Figure 3B:
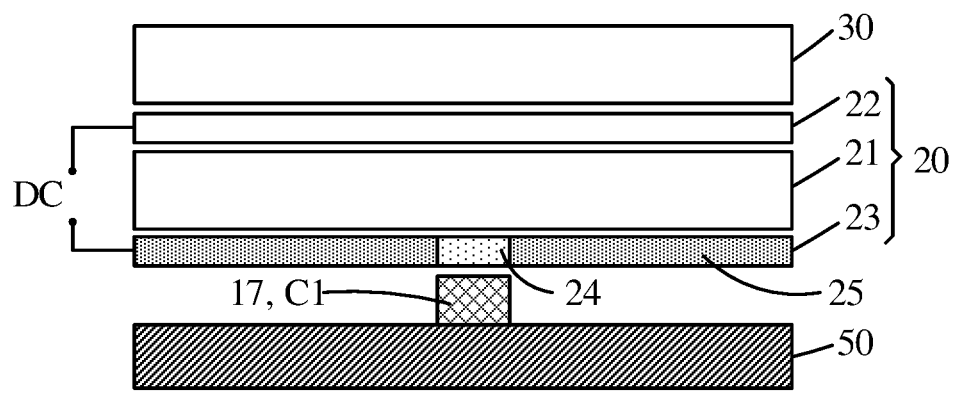
FIG. 3B is a sectional view of the terminal device taken along II-II of FIG. 1A in another example.

For touch control applications, the display unit 12 include a touch control electrode layer 40 interposed between the cover plate 30 and the display panel 20, as illustrated in FIG. 3A. The touch control electrode layer 40 is used to detect touch operations and generate sensing signals correspondingly for determining coordinate(s) of one or more than one touched points or a gesture formed by the touched points. The deployment of the touch control electrode layer 40 is optional and may be not required for the applications without touch control function, as depicted in FIG. 3B. That is, the terminal device 10 is also applicable to a display without the touch control function.

A first end of the first light sensing unit 17 is mounted on a printed circuit board 50. A second end opposite to the first end of the first light sensing unit 17 faces the display screen 12D for receiving the light transmitted through the display unit 12 for light sensing or image capturing. Electronic components for operating the first light sensing unit 17, the display panel 20, and the touch control electrode layer 40 may be mounted on the printed circuit board 50.

The second electrode 23 of the display panel 20 has a semi-transparent area 24 disposed corresponding to the position of the first light sensing unit 17. A remaining area 25 on the second electrode 23 is an area except for the semi-transparent area 24. In an embodiment, the semi-transparent area 24 and the remaining area 25 (i.e., the other areas on the second electrode 23 except for the semi-transparent area 24) of the second electrode 23 are distributed with a same material of metal particles. Concentration of the metal particles in the semi-transparent area 24 is less than the concentration of the metal particles in the remaining area 25. In an embodiment, the semi-transparent area 24 and the remaining area 25 (i.e., the other areas on the second electrode 23 except for the semi-transparent area 24) of the second electrode 23 are distributed with different materials of metal particles. Similarly, the concentration of the metal particles in the semi-transparent area 24 is less than the concentration of the metal particles in the remaining area 25. The semi-transparent area 24 and the remaining area 25 are parts of the second electrode 23 and belong to a same layer.

In an embodiment, the semi-transparent area 24 and the remaining area 25 are formed by coating one or more than one metal materials on an acrylic or polycarbonate sheet with different intensities. The metal material(s) may also be directly coated on the organic layer 21. In an embodiment, deposition is utilized to form the semi-transparent area 24 and the remaining area 25. In an embodiment, metal particles are sputtered to a first area on a substrate with a first concentration value and to a second area on the substrate with a second concentration value to form the semi-transparent area 24 corresponding to the first area and the remaining area 25 corresponding to the second area, where the first concentration value is less than the second concentration value.

Figure 4:
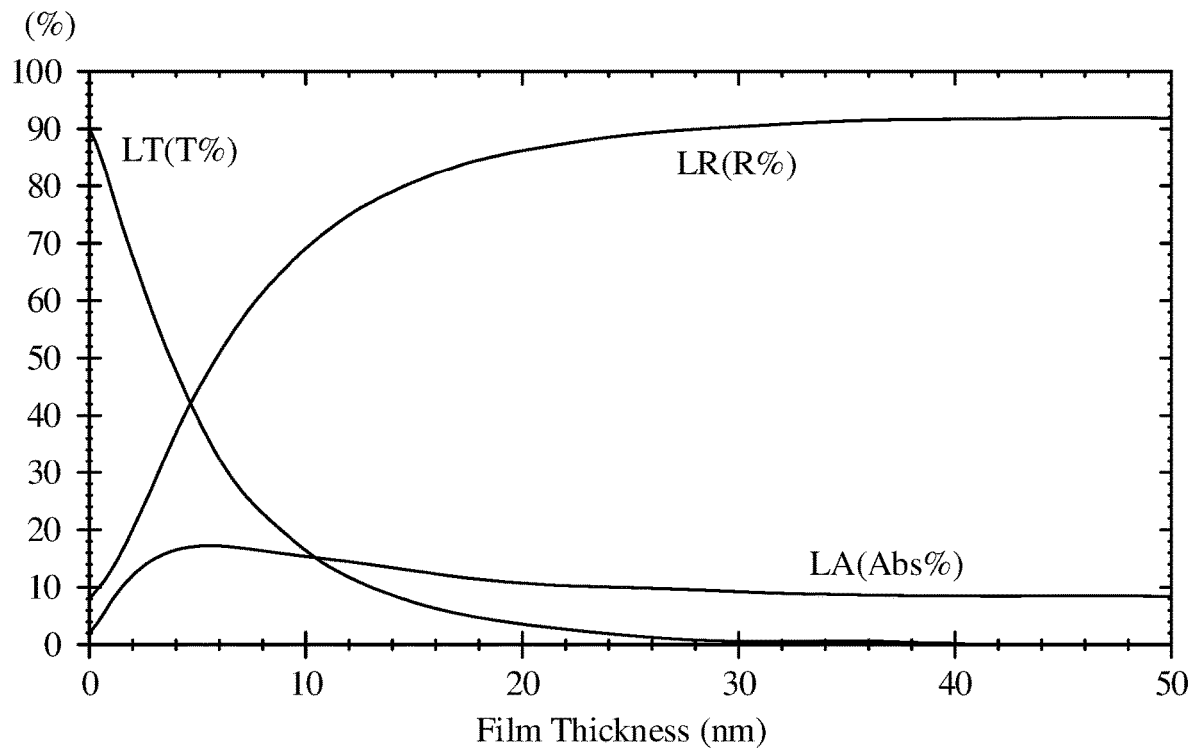
FIG. 4 is a diagram illustrating optical properties of a semi-transparent area illustrated in FIGS. 2A and 2B.

The light transmitted through the display screen 12D is substantially totally reflected by the remaining area 25 of the second electrode 23. The metal particles of the semi-transparent area 24 can realize similar effect as a one-way mirror for limited light transmission control. The semi-transparent area 24 is implemented by technology similar as a one-way mirror metal layer. The semi-transparent area 24 will partially reflect and partially transmit the light going toward the first light sensing unit 17. An example of optical properties of the semi-transparent area 24 formed using a coating film material, e.g., aluminum, is illustrated in FIG. 4, where a curve LR indicates reflectance, a curve LT indicates transmittance, a curve LA indicates absorption, a horizontal axis of this chart is a thickness of the coated film, and a vertical axis of this chart is percentages of the reflectance, the transmittance, and the absorption. The optical properties of the semi-transparent area 24 can be tuned by changing the thickness of the coated aluminum film.

Figure 5:
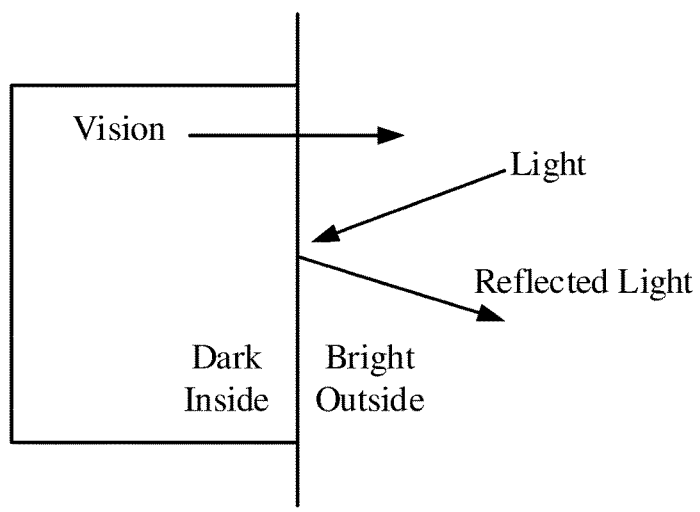
FIG. 5 is a diagram illustrating a vision from a bright side to a dark side.

For the coated aluminum film, light always passes equally in both directions. However, when one side of the film is bright and the other side of the film is dark, the dark side becomes difficult to see from the bright side because much more reflection is occurred at the bright side, as depicted in FIG. 5. The first light sensing unit 17 is placed inside the terminal device 10 so the first light sensing unit 17 is at the dark side. A user in front of the terminal device 10 is in an environment that is almost certainly brighter than the inside of the terminal device 10 so the user is at the bright side. Most of the light from the user's environment is reflected by the semi-transparent area 24 so the first light sensing unit 17 is almost invisible to the user. Accordingly, the deployment of the first light sensing unit 17 does not affect user experience in viewing the images displayed on the display screen 12D. Further, some of the light from the user's environment can still penetrate the semi-transparent area 24 and reach the first light sensing unit 17. Accordingly, the first light sensing unit 17 can detect luminance changes or capture images for face unlocking, for example.

As described above, the concentration of the metal particles in the semi-transparent area 24 is less than the concentration of the metal particles in the remaining area 25. An electrical field corresponding to the semi-transparent area 24 may be much weaker than the remaining area 25. Image content displayed corresponding to the semi-transparent area 24 may be abnormal due to the setting of metal particle concentration. To solve this problem, the thickness of the coated metal film or the concentration of the metal particles in the semi-transparent area 24 may be compromised with the light intensity sensed by the first light sensing unit 17. That is, for example, the thickness of the coated metal film forming the semi-transparent area 24 may be set thick enough so as not to affect the image content displayed in this area in sacrificing the light intensity sensed by the first light sensing unit 17 for a little bit. In an embodiment, an average voltage difference applied between the semi-transparent area 24 and the first electrode 22 is substantially as the same as the average voltage difference applied between the remaining area 25 and the first electrode 22, particularly in the case that the electrical fields generated corresponding to the semi-transparent area 24 and the remaining area 25 are not significantly different in magnitude, for the reason that the thickness of the semi-transparent area 24 are set relatively thick or, the concentration of the metal particles in the semi-transparent area 24 is set relatively large, as described above. In an embodiment, this can also be solved by increasing an average voltage difference applied between the semi-transparent area 24 and the first electrode 22. The average voltage difference applied between the semi-transparent area 24 and the first electrode 22 is greater than the average voltage difference applied between the remaining area 25 and the first electrode 22. That is, in average, the electrical field distribution is substantially the same in the semi-transparent area 24 and the remaining area 25.

This can also be solved by increasing the voltage applied to the semi-transparent area 24. The voltage applied to the semi-transparent area 24 is greater than the voltage applied to the remaining area 25 in average. That is, in average, the electrical field distribution is substantially the same in the semi-transparent area 24 and the remaining area 25.

Figure 6A:
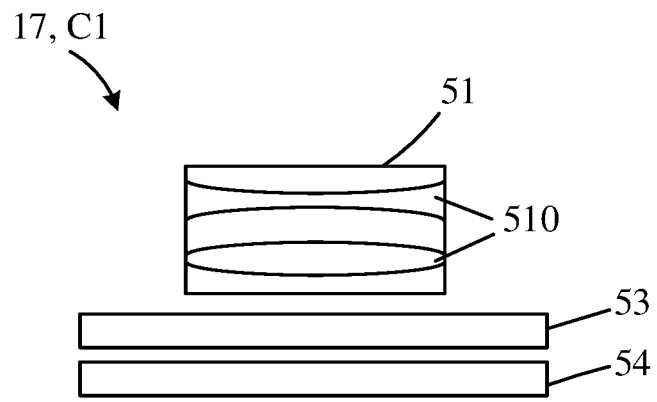
FIG. 6A is a diagram illustrating a first light sensing unit according to an embodiment of the present disclosure.
Figure 6B:
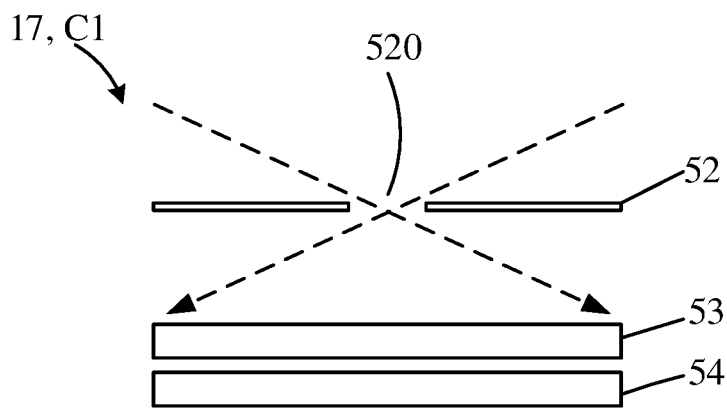
FIG. 6B is a diagram illustrating a first light sensing unit according to another embodiment of the present disclosure.

As illustrated in FIG. 6A, the first light sensing unit 17 includes a lens assembly 51 including one or more than one lenses 510, a luminance color filter 53, and an image sensor 54. The luminance color filter 53 is disposed between the lens assembly 51 and the image sensor 54. The image sensor 54 can be a charge coupled device (CCD) image sensor or a complementary metal oxide semiconductor (CMOS) image sensor. The light transmitted through the display screen 12D is reflected and/or refracted by the lens or lenses 510 of the lens assembly 51, filtered by the luminance color filter 53, and imaged on the image sensor 54. Instead of using the lens assembly 51 illustrated in FIG. 6A, a pin-hole imaging technique can be used to capture images. As illustrated in FIG. 6B, the first light sensing unit 17 includes a pin-hole plate 52 including one or more than one pin holes 520. The use of pin hole(s) can form a real image on the image sensor 54. In an embodiment, the first light sensing unit 17 can use one or more than one lenses 510 and one or more than one pin holes 520 to guide light paths.

Figure 7:
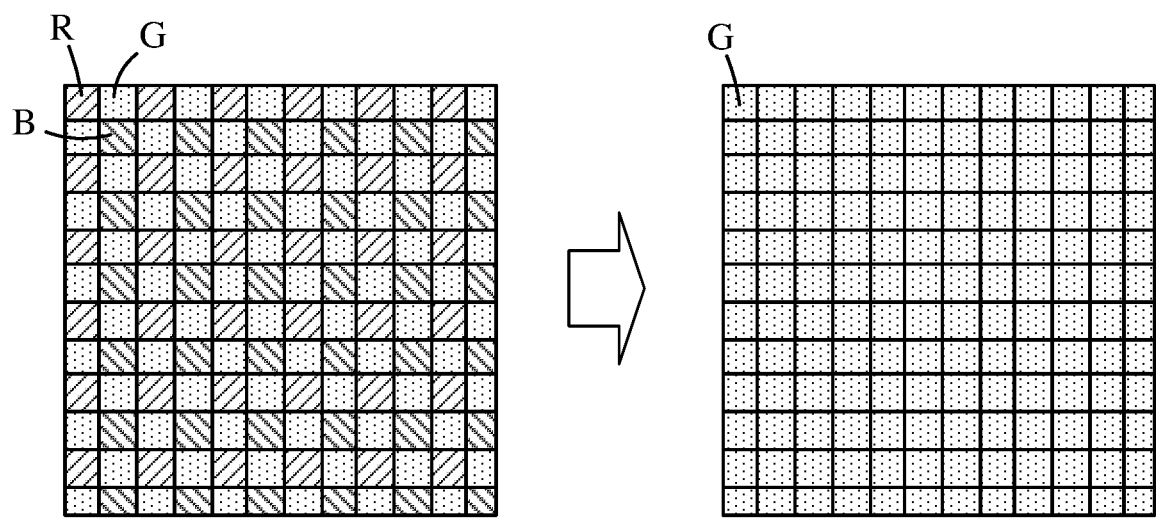
FIG. 7 is a diagram illustrating a beneficial effect using a luminance color filter.

Instead of using a RGB color filter, the luminance color filter 53 is used to maximize resolution in small size for some applications such as face unlocking. As depicted in FIG. 7, the RGB color filter includes red (R), green (G), and blue (B) color filter units. Light passes through each of the R, G, and B color filter units and is recorded as red, green, and blue pixels by the image sensor 54. An image dot of an image generated by the image sensor 54 includes at least a red pixel, a green pixel, and a blue pixel. In face-unlock applications, color information of a user's face is less important in recognizing the face. Luminance information of the face image is sufficient for face recognition. Accordingly, the luminance color filter 53 including mono-color filter units (e.g., green color illustrated in FIG. 7) is used in face unlocking. The luminance color filter 53 can increase resolution of the face image captured by the image sensor 54, and thus increase the chances of success in face unlocking.

When using the first light sensing unit 17 to capture an image, the captured image may be affected by the luminance of displayed images on the display screen 12D because the light from the display screen 12D may be received, more or less, by the first light sensing unit 17. To solve this problem, in an embodiment, the display screen 12D is turned off when the first light sensing unit 17 operates to capture the image. After the first light sensing unit 17 stops capturing the image, the display screen 12D is turned on to show displayed images.

Figure 8:
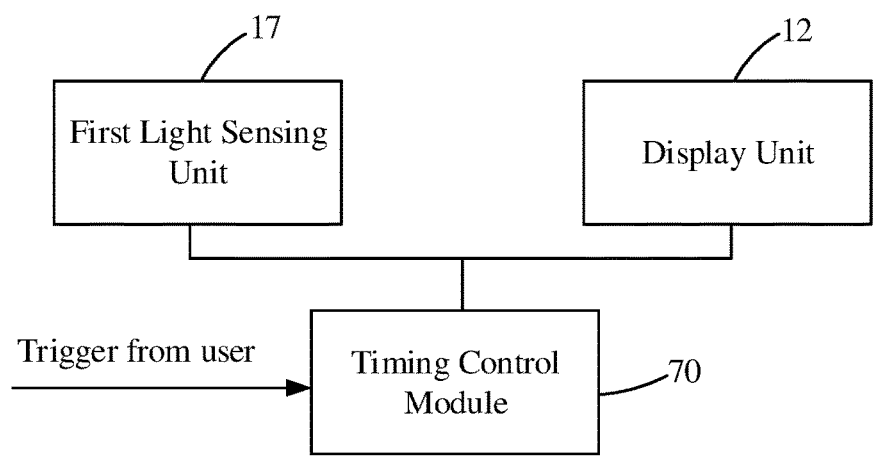
FIG. 8 is a diagram illustrating relations between a timing control mode, a first light sensing unit, and a display unit of a terminal device.

Referring to FIG. 8, the terminal device 10 further includes a timing control module 70 connecting to the first light sensing unit 17 and a display unit 12. The timing control module 70 may be a hardware component deployed in the terminal device 10, a firmware, or an instruction set or program codes executable by a processor of the terminal device 10. In an example, the timing control module 70 is a background process running on an operating system, such as ANDROID operating system and IOS operating system, of the terminal device 10. The timing control module 70 is configured to control a timing sequence in operating the first light sensing unit 17 and the display unit 12. After an image capturing request is received by the timing control module 70, the timing control module 70 asks the display unit 12 to turn off the display screen 12D and controls the first light sensing unit 17 to sense light intensity or capture one or more than one images while the display screen 12D is turned off. After the first light sensing unit 17 completes in light sensing or image capturing, the timing control module 70 controls the display unit 12 to resume displaying images. The off time of the display screen 12D is longer enough for the first light sensing unit 17 to sense the light intensity or capture the image(s). The off time of the display screen 12D can be adjusted for different application scenarios. In an example, the off time is 100 ms or longer.

Figure 9:
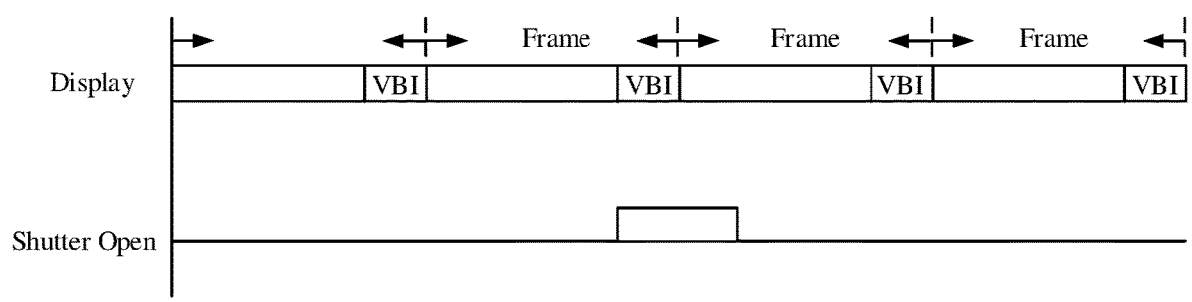
FIG. 9 is a diagram illustrating a timing sequence of displayed images and a shutter of a first light sensing unit.

In an embodiment, a shutter of the first light sensing unit 17 may be opened for a predetermined period of time based on a vertical blanking interval (VBI) of a frame of images displayed by the display unit 12. As illustrated in FIG. 9, the time to open the shutter of the first light sensing unit 17 is based on the VBI of an image frame displayed on the display screen 12D. During the VBI, there is almost no display content illustrated on the display screen 12D, that is, the display screen 12D is almost dark during this period. The shutter is opened during this period so as to prevent the luminance of displayed images on the display screen 12D from affecting the light intensity sensing or the image capturing by using the first light sensing unit 17.

The open duration of the shutter may be greater than the VBI of an image frame as depicted in FIG. 9. That is, each sensing or capturing of the first light sensing unit 17 may still be affected by the luminance of the display screen 12D at least for a part of the open duration of the shutter not overlapping with the VBI. However, this can be easily corrected by removing the signal corresponding to the part of the open duration of the shutter not overlapping with the VBI, or by determining an appropriate open duration of the shutter that is not significantly affected by the luminance of the display screen 12D, or by image processing performed on the captured image by the first light sensing unit 17, or by any other suitable approaches. This approach facilitates the correction on the captured image.

The open duration of the shutter overlaps with the VBI of the image frame displayed by the display unit 12. The open duration of the shutter may start at a start of the VBI. The open duration of the shutter may end at an end of the VBI. Alternatively, a middle of the open duration of the shutter aligns with a middle of the VBI. The start, the end, or any given point of the open duration of the shutter is based on the VBI.

In an embodiment, the shutter of the first light sensing unit 17 may be opened for more than one time at a predetermined time interval based on the VBIs of image frames displayed by the display unit 12. The light intensity or the captured content is accumulated to get a desired result. For example, the first light sensing unit 17 takes multiple shots, and get a still image by accumulating or processing all of the captured content.

Referring to FIGS. 8 and 9, after an image capturing request is received by the timing control module 70, the timing control module 70 control the shutter of the first light sensing unit 17 to be opened for a predetermined period of time based on the VBI of the image frame displayed by the display unit 12. In addition, based on instructions provided by the timing control module 70, the shutter of the first light sensing unit 17 may be opened for more than one time at a predetermined time interval based on the VBIs. There is no need to turn off the display screen 12D while the light sensing or image capturing performed by the first light sensing unit 17.

The afore-described approach allows the first light sensing unit 17 to sense the light intensity or capture one or more images while the display screen 12D is on. That is, the display screen 12D does not need to be turned off manually or automatically in using the first light sensing unit 17 to sense the light intensity or capture the image(s). Accordingly, the user is not interrupted in viewing the content displayed on the display screen 12D when using the function of the first light sensing unit 17, and thus user viewing experience is improved.

Figure 10:
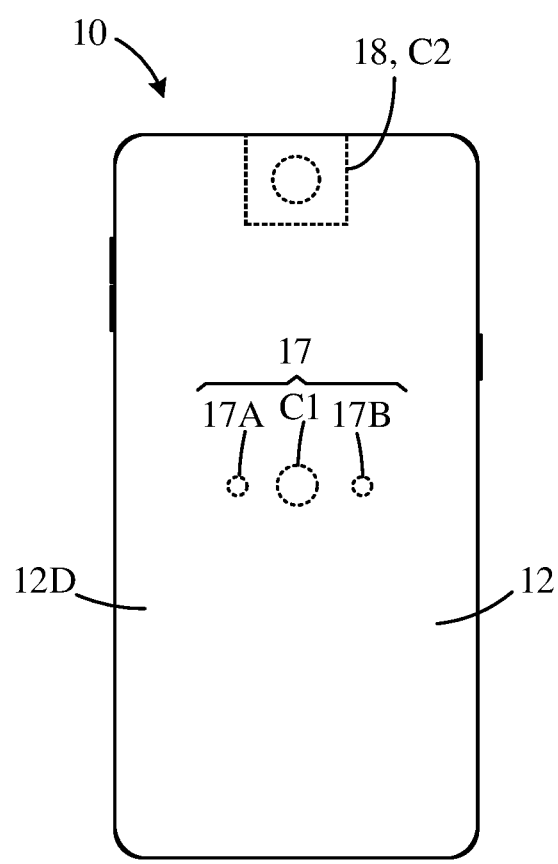
FIG. 10 is a front view of a terminal device according to an embodiment of the present disclosure.

Referring to FIG. 10, the first light sensing unit 17 may include the first front-facing camera C1, a luminance sensor 17A, and a proximity sensor 17B that are disposed below the display screen 12D and the display unit 12. The first front-facing camera C1 is provided for face unlocking, for example. The luminance sensor 17A is provided for correcting the luminance of the display screen 12D. The proximity sensor 17B is provided for detecting the approach of a user's face to the display screen 12D. Any one of or both of the luminance sensor 17A and the proximity sensor 17B are provided below the display unit 12. In an embodiment, one camera C1 and one luminance sensor 17A are provided below the display unit 12. In an embodiment, one camera C1 and one proximity sensor 17B are provided below the display unit 12. In an embodiment, the terminal device 10 have one camera C1, one luminance sensor 17A, and one proximity sensor 17B provided below the display unit 12.

Figure 11A:
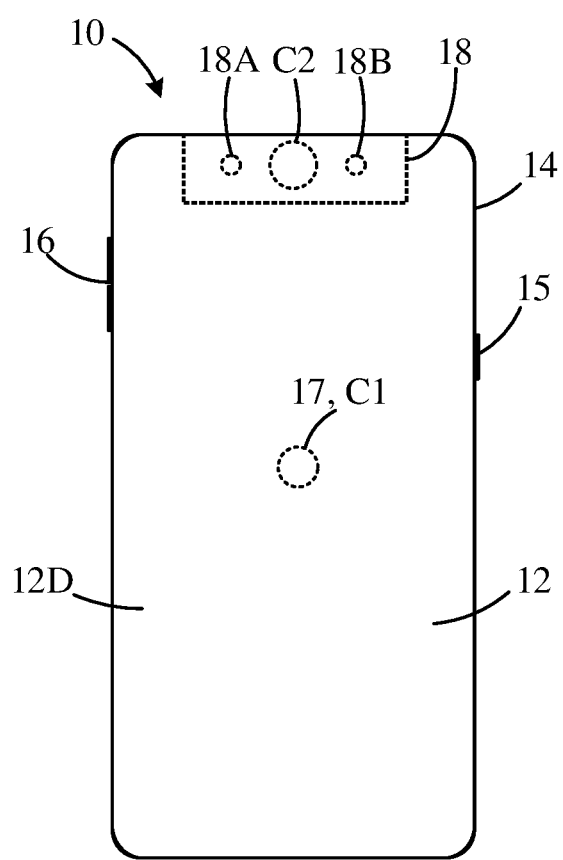
FIG. 11A is a front view of a terminal device having an inactive light sensing unit according to an embodiment of the present disclosure.
Figure 11B:
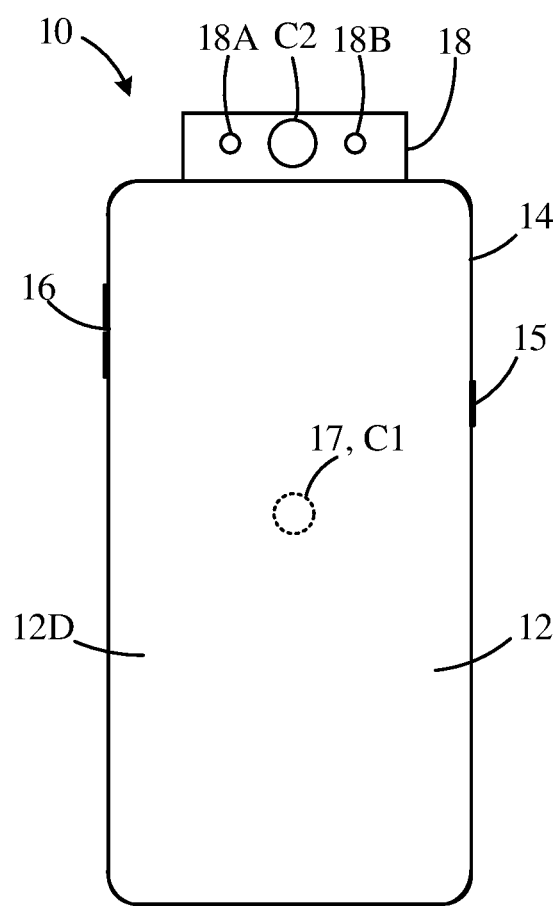
FIG. 11B is a front view of a terminal device having an active light sensing unit according to an embodiment of the present disclosure.

Referring to FIGS. 11A and 11B, the second light sensing unit 18 may include the second front-facing camera C2, a luminance sensor 18A, a proximity sensor 18B that are placed inside the outer case 14 in an inactive state (see FIG. 11A) and extend outside the outer case 14 in an active state (see FIG. 11B). The second front-facing camera C2 is provided for selfies and/or video chatting, for example. The luminance sensor 18A is provided for correcting the luminance of the display screen 12D. The proximity sensor 18B is provided for detecting the approach of a user's face to the display screen 12D. Any one of or both of the luminance sensor 18A and the proximity sensor 18B are included in the second light sensing unit 18. In an embodiment, the second light sensing unit 18 includes one camera C2 and one luminance sensor 18A. In an embodiment, the second light sensing unit 18 includes one camera C2 and one proximity sensor 18B. In an embodiment, the second light sensing unit 18 includes one camera C2, one luminance sensor 18A, and one proximity sensor 18B. In an embodiment, all of the second front-facing camera C2, the luminance sensor 18A, and the proximity sensor 18B extend outside the outer case 14 simultaneously in response to activation and retract inside the outer case 14 simultaneously in response to deactivation.

Figure 12:
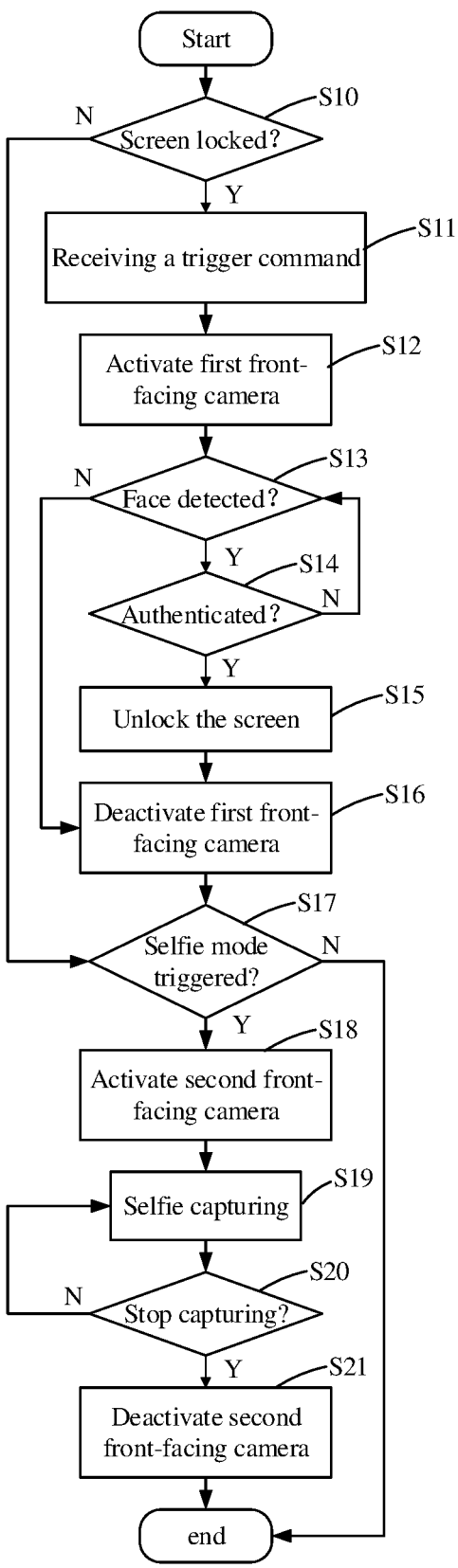
FIG. 12 is a flowchart of a dual front-facing camera operating method according to an embodiment of the present disclosure.

FIG. 12 is a flowchart of a dual front-facing camera operating method according to an embodiment of the present disclosure. Referring to FIG. 12 in accompanying above descriptions, the dual front-facing camera operating method is described in detail below.

As described above, the terminal device 10 includes the first light sensing unit 17 (e.g., the first front-facing camera C1) located below the display unit 12 and provided at a rear side of the display unit 12, and the second light sensing unit 18 (e.g., the second front-facing camera C2) is placed inside a body of the terminal device 10 when inactive and extends outside the body of the terminal device 10 when active.

In block S10, whether the display screen 12D is locked is determined by a processor of terminal device 10, for example. If the display screen 12D is locked, the process uses a face image of a user to unlock the display screen 12D. If the display screen 12D is unlocked, the process determines whether the user wants to take a photograph such as a selfie. The terminal device 10 receives a trigger command (S11) such as motion, tap, power button, etc., to activate the first front-facing camera C1 located below the display unit 12 (S12) to trace the user's face and take a photograph of the user's face. If the first front-facing camera C1 does not detect any face (S13) within a predetermined period of time, the process may directly deactivate the first front-facing camera C1 to save power. If a face is detected by the first front-facing camera C1 (S13), the process determines whether the user is a legal user using the detected face image (S14). If the user is authenticated, the process unlocks the display screen 12D (S15). If the user is not authenticated, another shot of the face may be executed for the user to authenticate again (S13). The process may allow the user to use another approach, such as text password input, for the authentication. The first front-facing camera C1 is deactivated (S16) once the display screen 12D is unlocked. The first front-facing camera C1 is used for face unlocking.

The process goes to block S17 after block S16. In block S17, whether a selfie mode is triggered is determined by the process, for example. If the selfie mode is not triggered by the user, the process is terminated. In the selfie mode, the second front-facing camera C2 is activated by extending outside the body of the terminal device 10 (S18) and starts selfie capturing to take selfie images (e.g., human bodies, objects, and/or scenes) and/or for video chatting in front of the terminal device 10 (S19). If the capturing is stopped for a predetermined amount of time or the user triggers a button to stop the capturing (S20), the second front-facing camera C2 retracts inside the body of the terminal device and the second front-facing camera C2 is deactivated (S21) to save power. The second front-facing camera C2 is used for selfie image capturing.

In the dual front-facing camera operating method, the second front-facing camera C2 can keep same user experience as a traditional front-facing camera when used in picture and video capturing, video chatting, and the like, and the face unlocking function using the first front-facing camera C1 is instant without a need to wait for camera pop-out for authentication. This approach can maximize the display screen-to-body ratio without sacrificing any user experience for instant face unlocking and image capturing.

Figure 13:
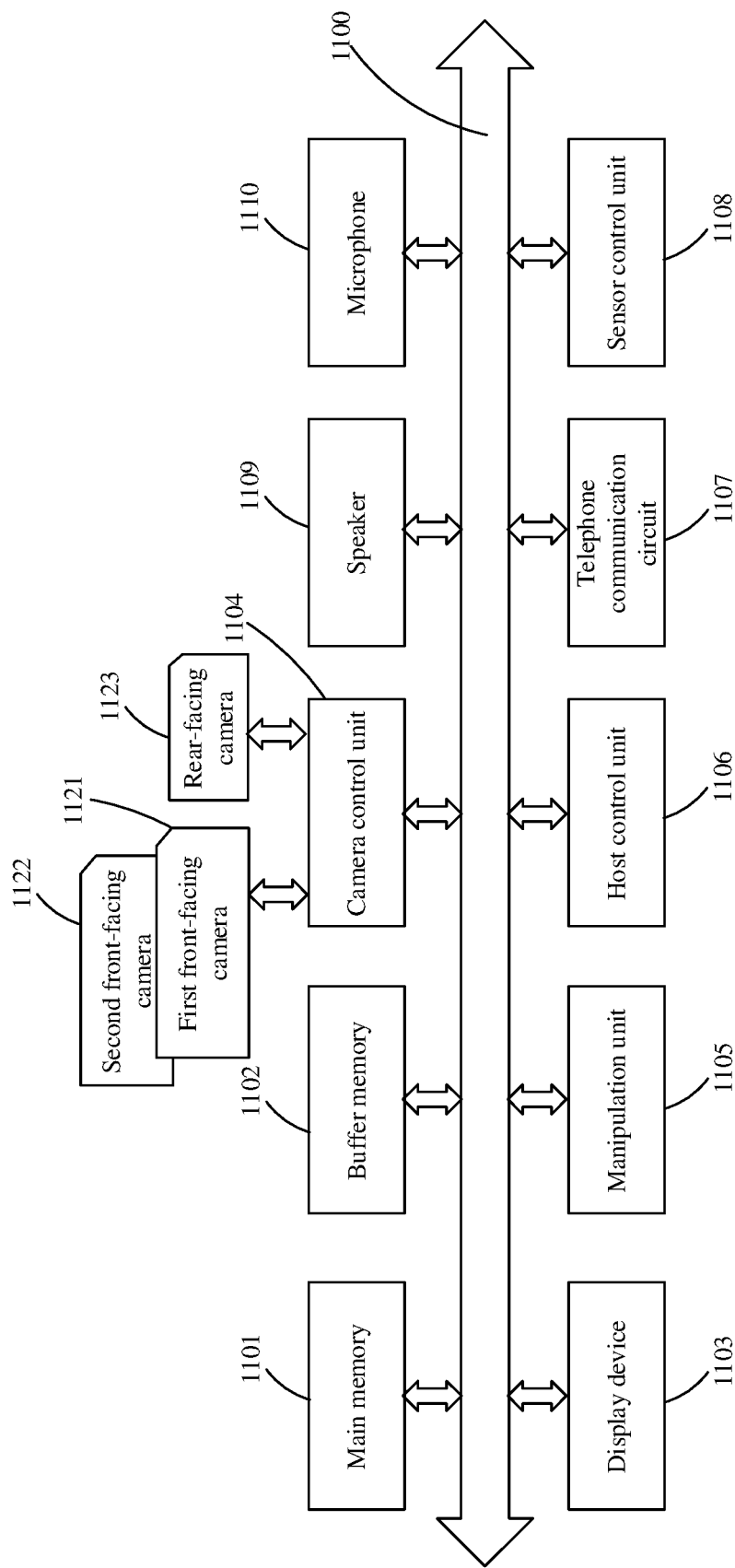
FIG. 13 is a block diagram illustrating a framework of a terminal device according to an embodiment of the present disclosure.

FIG. 13 is a block diagram illustrating a framework of the terminal device 10 according to an embodiment of the present disclosure. The terminal device 10 includes a main memory 1101, a buffer memory 1102, a display device 1103, a camera control unit 1104, a manipulation unit 1105, a host control unit 1106, a telephone communication circuit 1107, a sensor control unit 1108, a speaker 1109, a microphone 1110, and a bus 1100 connecting to the aforesaid components. The terminal device 10 further includes a first front-facing camera 1121, a second front-facing camera 1122, and a rear-facing camera 1123 that are connected to the camera control unit 1104.

A microcomputer of the host control unit 1106 stores a software program for controlling various processes of the terminal device. The host control unit 1106 executes various control processes based on such a software program. The main memory 1101 stores, for example, data such as phone book data or mail addresses, or a uniform resource locator (URL). In addition, the main memory 112 may store the image data captured using the first front-facing camera 1121, the second front-facing camera 1122, and the rear-facing camera 1123. The buffer memory 1102 is used as a work area when the host control unit 1106 executes the processes based on the software program.

The telephone communication circuit 1107 is a radio communication unit for executing telephone communication or other information communication (including communication via the Internet) via a base station and a mobile phone network. Under control of the host control unit 1106, call voice from a counterpart, received by the telephone communication circuit 1107, is emitted from the speaker 1109, and transmitted voice received by the microphone 1110 is transmitted to the counterpart through the telephone communication circuit 1107. The telephone communication circuit 1107 may also transmit/receive the image data captured by the cameras 1121, 1122, 1123 in the case of video chatting or video phone calls.

The display device 1103 displays various images under control of the host control unit 1106 and simultaneously displays the image of the counterpart transmitted from the counterpart in the case of the video chatting or the video phone calls. The manipulation unit 1105 includes functional buttons such as a power button and a volume up/down button. The host control unit 1106 is configured to detect what kind of key is pressed using the manipulation unit 1105 and execute the control process operation corresponding to the manipulated key. The sensor control unit 1108 controls a plurality of sensors such as a touch sensor, a GPS sensor, and a gyroscope sensor.

In addition, the first front-facing camera 1121, the second front-facing camera 1122, and the rear-facing camera 1123 are connected to the camera control unit 1104. When a camera capture function, a video chatting function, or a video phone function is activated, the captured image data are received by the bus 1100 through the camera control unit 1104.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are examples only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A terminal device, comprising:
   a display unit having a display screen, the display unit configured to display images on the display screen;
   an outer case configured to receive the display unit;
   a first light sensing unit located below the display unit and configured to sense incident light transmitted through the display screen;
   a second light sensing unit moveably held to a first position inside the outer case responsive to deactivation of the second light sensing unit and moveably held to a second position outside the outer case responsive to activation of the second light sensing unit; and
   a timing control module configured to control a shutter of the first light sensing unit to be opened during and longer than a vertical blanking interval of a frame of images displayed by the display unit,
   wherein the first light sensing unit captures an image of an object while the shutter is open.

2. The terminal device according to claim 1, wherein the first light sensing unit is located between the display unit and the outer case or located at a center of the display screen.

3. The terminal device according to claim 1, wherein the second light sensing unit extends from an edge of the outer case when the second light sensing unit is activated.

4. The terminal device according to claim 1, wherein the outer case comprises a slot disposed corresponding to the second light sensing unit, and the second light sensing unit extends outside the outer case via the slot.

5. The terminal device according to claim 1, wherein the second light sensing unit is rotatably held to a front position as a front-facing camera and is rotatably held to a rear position as a rear-facing camera.

6. The terminal device according to claim 1, wherein the second light sensing unit comprises:
   a first shutter;
   a second shutter disposed opposite to the first shutter;
   a light guide located between the first shutter and the second shutter;
   an image sensor configured to capture images; and
   a lens group comprising one or more lens, the lens group located between the light guide and the image sensor,
   wherein the first shutter and the second shutter are inversely operated.

7. The terminal device according to claim 1, wherein the first light sensing unit and the second light sensing unit offset from each other a distance.

8. The terminal device according to claim 1, wherein the first light sensing unit and the second light sensing unit are carried by a first front-facing camera and a second front-facing cameras, respectively.

9. The terminal device according to claim 1, wherein the display unit comprises a display panel, comprising:
   a first electrode which is a transparent electrode;
   a second electrode which is an opaque electrode; and
   an organic layer sandwiched between the first electrode and the second electrode, wherein the organic layer spontaneously emits light when a voltage difference is applied between the first electrode and the second electrode.

10. The terminal device according to claim 9, wherein the display unit further comprises a touch control electrode layer configured to detect touch operations and generate sensing signals correspondingly for determining coordinate(s) of one or more touched points or a gesture formed by the touched points.

11. The terminal device according to claim 9, wherein the second electrode has a semi-transparent area disposed corresponding to the first light sensing unit and a remaining area which is an area of the second electrode except for the semi-transparent area.

12. The terminal device according to claim 11, wherein the semi-transparent area and the remaining area are distributed with metal particles, and a concentration of the metal particles in the semi-transparent area is less than a concentration of the metal particles in the remaining area.

13. The terminal device according to claim 12, wherein a material of the metal particles distributed in the semi-transparent area is identical to or different from a material of the metal particles distributed in the remaining area.

14. The terminal device according to claim 11, wherein the remaining area is configured to totally reflect the incident light transmitted through the display screen, and the semi-transparent area is configured to partially reflect and partially transmit the light transmitted through the display screen.

15. The terminal device according to claim 11, wherein the semi-transparent area corresponds to a metal film, and transmittance and reflectance of the metal film are defined by a thickness of the metal film.

16. The terminal device according to claim 11, wherein an average voltage difference applied between the semi-transparent area and the first electrode is greater than the average voltage difference applied between the remaining area and the first electrode.

17. The terminal device according to claim 1, wherein the first light sensing unit comprises a luminance color filter which comprises mono-color filter units.

18. The terminal device according to claim 1, wherein at least one of the first light sensing unit or the second light sensing unit comprises a camera and a luminance sensor provided for correcting a luminance of the display screen.

19. A terminal device, comprising:
a display unit having a display screen, the display unit configured to display images on the display screen;
an outer case configured to receive the display unit;
a first front-facing camera configured for face unlocking, the first front-facing camera located below the display unit and configured to sense incident light transmitted through the display screen;
a second front-facing camera configured for at least one of selfies or video chatting, the second front-facing camera moveably held to a first position inside the outer case responsive to deactivation of the second front-facing camera and moveably held to a second position outside the outer case responsive to activation of the second front-facing camera; and
a timing control module configured to control a shutter of the front-facing camera to be opened during and longer than a vertical blanking interval of a frame of images displayed by the display unit,
wherein the first front-facing camera captures an image of a face while the shutter is open.

20. A dual front-facing camera operating method, applied to a terminal device comprising a display unit configured to display images on a display screen of the display unit, the method comprising:
determining whether the display screen is locked;
activating a first front-facing camera located below the display unit to capture an image of a face of a user based on a determination that the display screen is locked, comprising:
controlling a shutter of the front-facing camera, by a timing control module, to be opened during and longer than a vertical blanking interval of a frame of images displayed by the display unit; and
capturing the image of the face while the shutter is open;
authenticating the user by using the captured face image of the user;
unlocking the display screen and deactivating the first front-facing camera based on a determination that the user is authenticated;
determining whether a selfie mode is triggered;
activating a second front-facing camera by extending the second front-facing camera outside a body of the terminal device for at least one of taking selfie images or video chatting in front of the terminal device based on a determination that the selfie mode is triggered; and
deactivating the second front-facing camera by retracting the second front-facing camera inside the body of the terminal device after completing at least one of image capturing or video recording.

* * * * *